(12) United States Patent
Wolleschensky et al.

(10) Patent No.: US 6,891,613 B2
(45) Date of Patent: May 10, 2005

(54) METHOD FOR THE DETECTION OF DYES IN FLUORESCENCE MICROSCOPY

(75) Inventors: Ralf Wolleschensky, Schoeten (DE); Gunter Moehler, Jena (DE)

(73) Assignee: Carl Zeiss Jena GmbH, Jena (DE)

(*) Notice: Subject to any disclaimer, the term of this patent is extended or adjusted under 35 U.S.C. 154(b) by 0 days.

(21) Appl. No.: 10/419,077

(22) Filed: Apr. 17, 2003

(65) Prior Publication Data

US 2003/0206296 A1 Nov. 6, 2003

Related U.S. Application Data

(63) Continuation of application No. 09/895,517, filed on Jun. 28, 2001.
(60) Provisional application No. 60/230,345, filed on Sep. 6, 2000.

(30) Foreign Application Priority Data

Jun. 29, 2000 (DE) .......................... 100 33 180

(51) Int. Cl.[7] ................................ G02J 3/28
(52) U.S. Cl. .................. 356/326; 359/368; 356/317; 250/459.1; 250/339.01; 250/339.02
(58) Field of Search ................ 356/300, 326, 356/417, 234, 317, 346, 301; 250/458.1, 234, 459.1, 339.01, 339.02; 359/368, 370, 385

(56) References Cited

U.S. PATENT DOCUMENTS

| | | | |
|---|---|---|---|
| 4,844,617 A | 7/1989 | Kelderman et al. | ......... 356/372 |
| 5,192,980 A | 3/1993 | Dixon et al. | ......... 356/326 |
| 5,329,352 A | 7/1994 | Jacobsen | ......... 356/301 |
| 5,356,088 A | 10/1994 | Fujisawa et al. | ......... 242/334.4 |
| 5,461,477 A | 10/1995 | Marinelli et al. | ......... 356/352 |

(Continued)

FOREIGN PATENT DOCUMENTS

| | | |
|---|---|---|
| DE | 34 32 252 A1 | 3/1986 |
| DE | 43 30 347 A1 | 3/1995 |
| DE | 199 15 137 A1 | 10/2000 |
| DE | 296 24 210 U1 | 6/2001 |
| DE | 100 38 049 A1 | 2/2002 |
| EP | 0 463 600 | 1/1992 |
| EP | 0 548 830 A1 | 12/1992 |
| EP | 0 597 639 A | 5/1994 |
| JP | 09 119897 | 5/1997 |
| WO | WO 99 01750 A | 1/1999 |
| WO | WO 00/31577 | 6/2000 |
| WO | WO 01/09592 A1 | 2/2001 |

OTHER PUBLICATIONS

XP–002190188 M. M. Yang: "Fluorescence Imaging Micro–Spectrophotometer (FIMS)" Biotechnology Et Allia, (Online) 1997, pp. 1–16.
XP 002190189 M. M. Yang: "Hyperspectral Image Compression and Client/Server Software" Internet Article, (Online), downloaded from the Internet on Feb. 3, 2002 pp. 3–25.
English Abstract of DE 34 32 252 A1.
English Abstract of DE 43 30 347 A1.
English Abstract of DE 296 24 210 U1.
English Abstract of DE 199 15 137 A1.
English Abstract of DE 100 38 049 A1.
Article: "Resolution of multiple green fluorescent protein color variants and dyes using two–photon microscopy and imaging spectroscopy" Journal of Biomedical Optics Jul. 2001 vol. 6. No. 3 pp. 311–318.

*Primary Examiner*—Drew A. Dunn
*Assistant Examiner*—Joshua L Pritchett
(74) *Attorney, Agent, or Firm*—Reed Smith LLP

(57) ABSTRACT

A method for optical detection of characteristic quantities of the wavelength-dependent behavior of an illuminated specimen, such as the emission behavior and/or absorption behavior, preferably the fluorescence and/or enzyme fluorescence comprises determining at least one spectral centroid and/or a maximum of the emission radiation and/or of the absorbed radiation. An arrangement for performing the method is disclosed.

87 Claims, 14 Drawing Sheets a.)

b.)

Typical spectra with ratiometric measurements
a) a dye with emission ratio; b) two dyes with ion-dependent signals

U.S. PATENT DOCUMENTS

| | | | |
|---|---|---|---|
| 5,528,368 A | 6/1996 | Lewis et al. | 356/346 |
| 5,539,517 A | 7/1996 | Cabib et al. | 356/346 |
| 5,638,173 A | 6/1997 | Smith et al. | 356/301 |
| 5,689,333 A | 11/1997 | Batchelder et al. | 356/301 |
| 5,723,288 A | 3/1998 | Dykstra et al. | 435/6 |
| 5,737,077 A | 4/1998 | Lee et al. | 356/317 |
| 5,760,899 A | 6/1998 | Eismann | 356/326 |
| 5,784,162 A | 7/1998 | Cabib et al. | 356/346 |
| 5,817,462 A | 10/1998 | Garini et al. | 435/6 |
| 5,859,700 A | 1/1999 | Yang | 356/300 |
| 5,986,256 A | 11/1999 | Yagi | 250/234 |
| 6,040,907 A | 3/2000 | Steiner et al. | 356/311 |
| 6,084,680 A | 7/2000 | Tuunanen et al. | 356/417 |
| 6,319,682 B1 | 11/2001 | Hochman | 435/29 |
| 6,337,472 B1 | 1/2002 | Garner et al. | 250/201.3 |
| 6,342,701 B1 | 1/2002 | Kash | 250/458.1 |

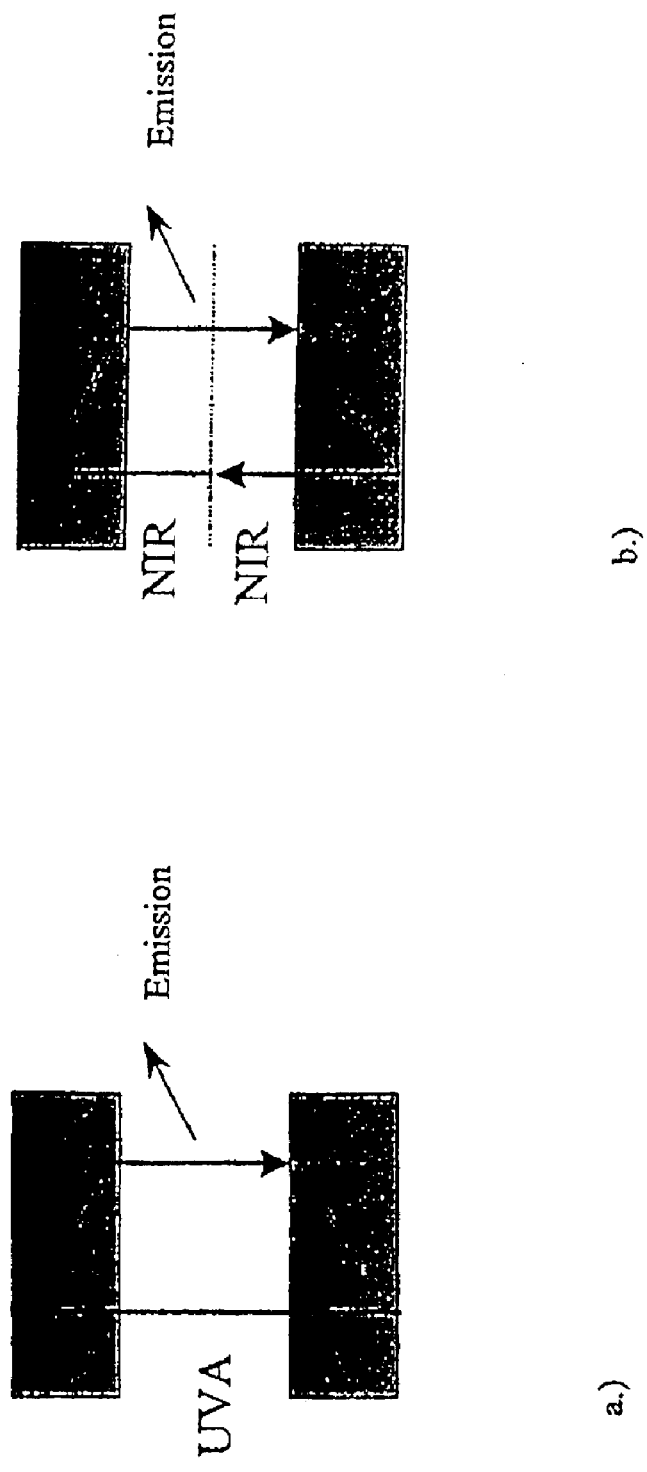
Figure: 1
a) Single-photon absorption; b) multiphoton absorption

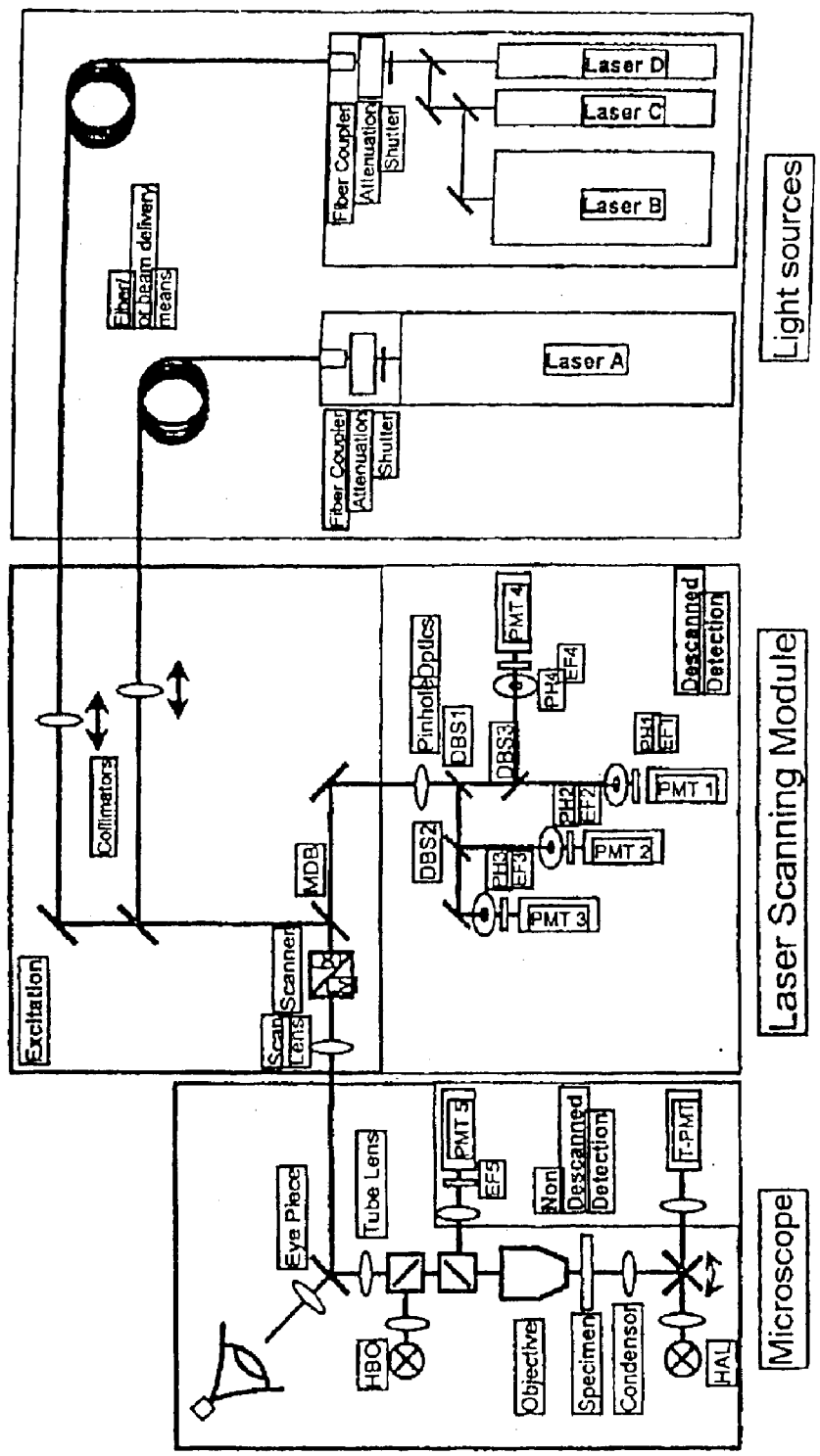
Figure: 2
LSM construction (prior art)

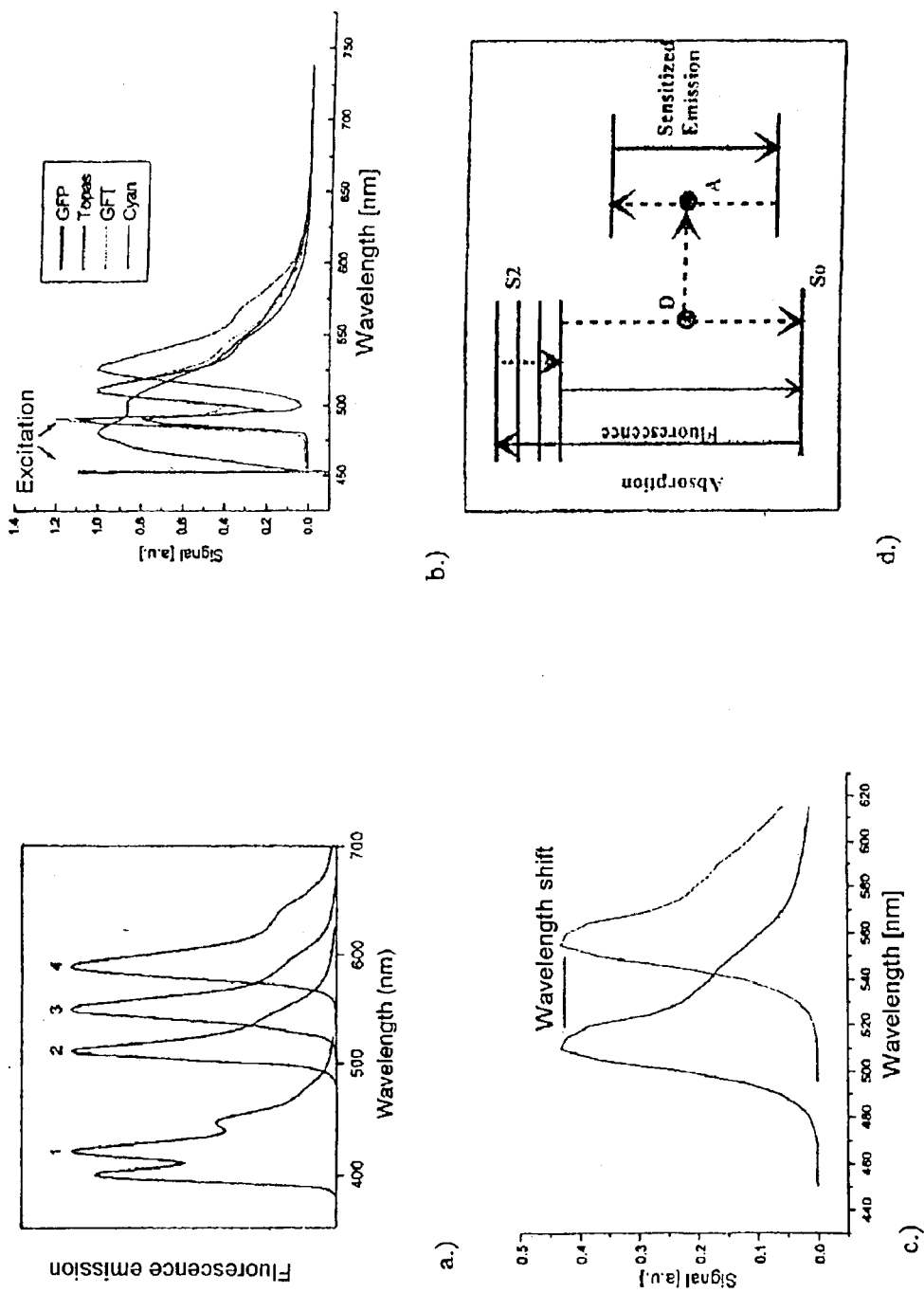
Figure: 3
Typical spectra: a) dyes; b) fluorescent proteins
c) wavelength shift depending on environment; d) FRET

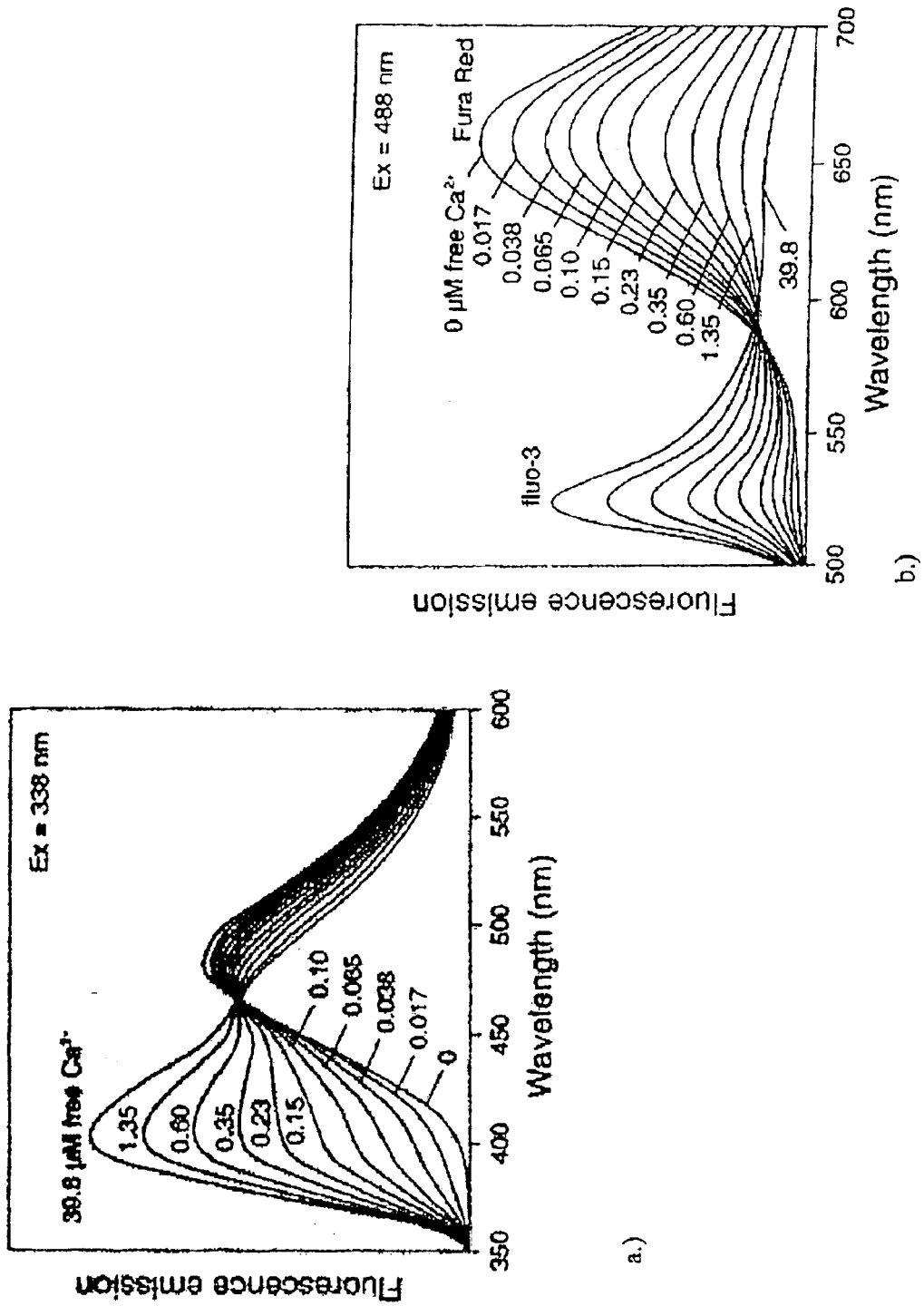
Figure: 4
Typical spectra with ratiometric measurements
a) a dye with emission ratio; b) two dyes with ion-dependent signals

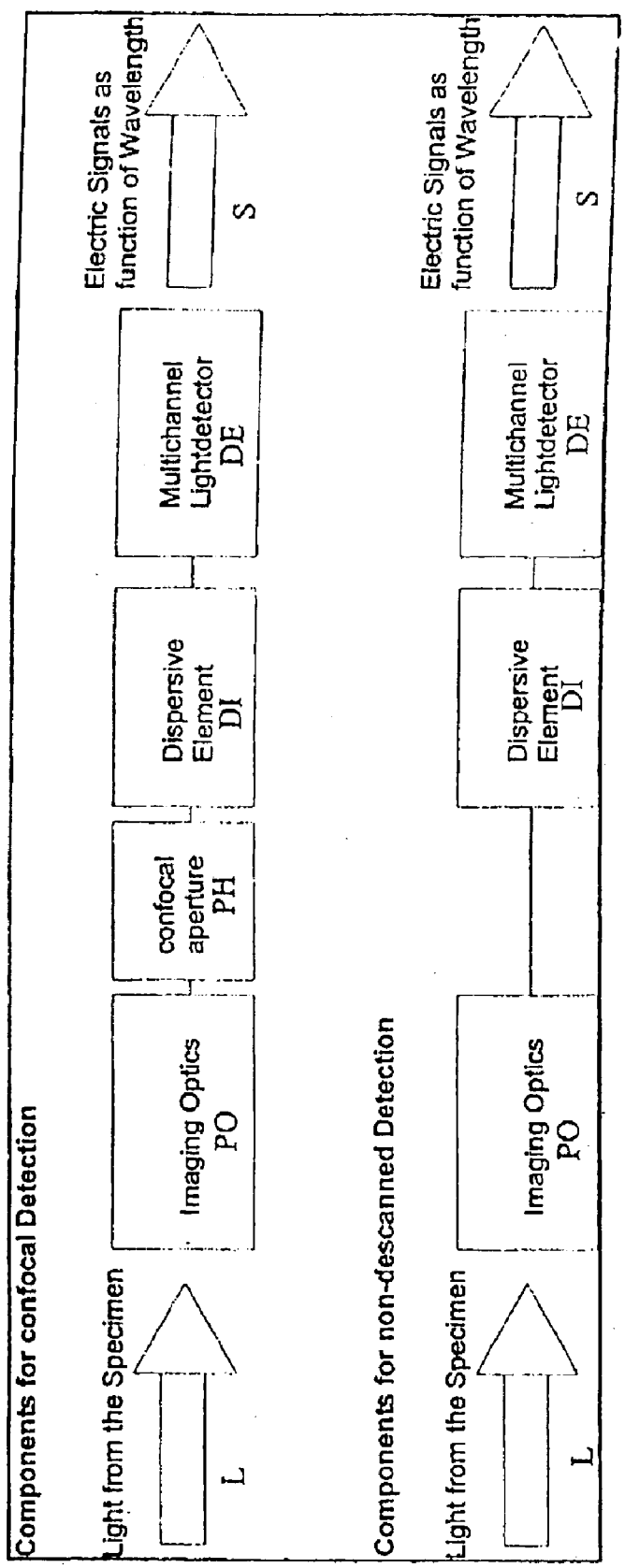
Figure: 5
Block diagram showing construction of detector unit-optics

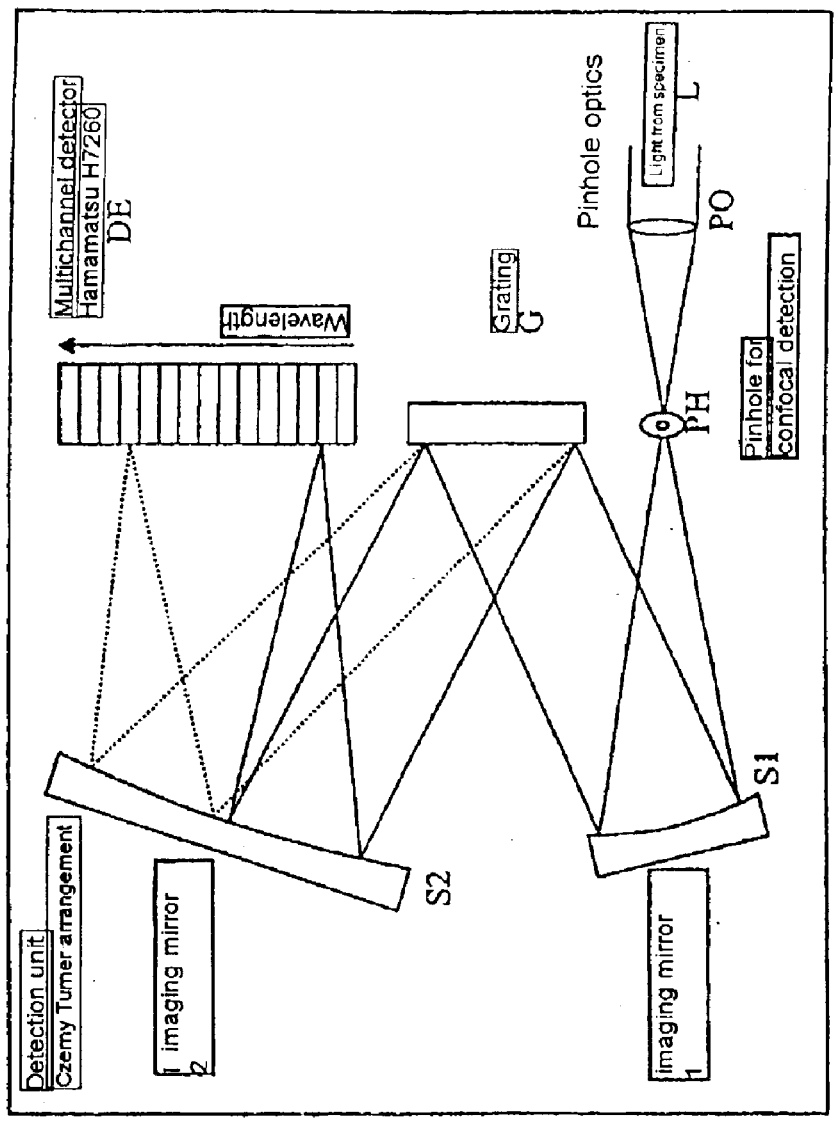
Figure: 6
Example for detector unit-optics construction

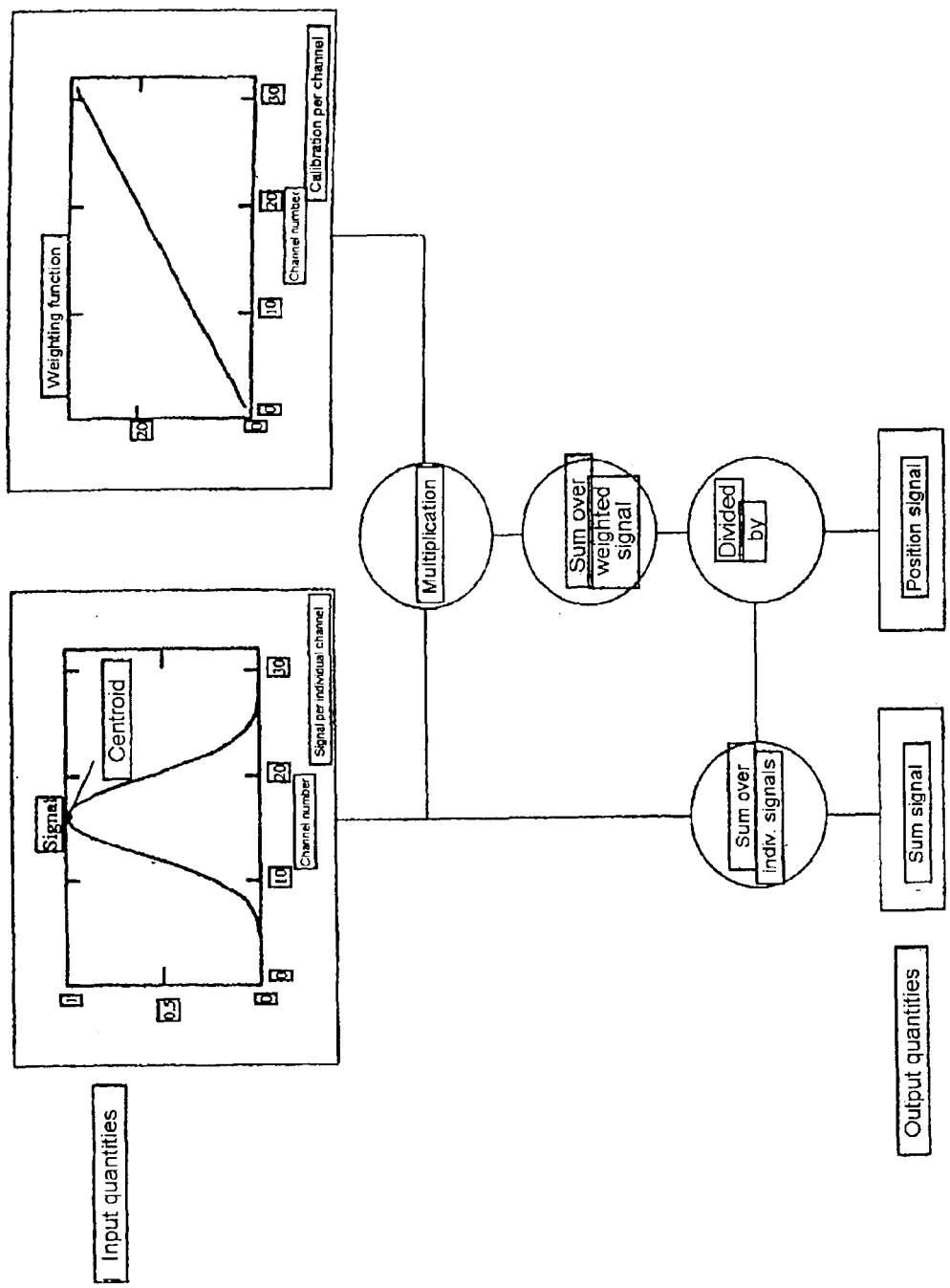
Figure: 7
Algorithm for determining the position of the emission spectrum

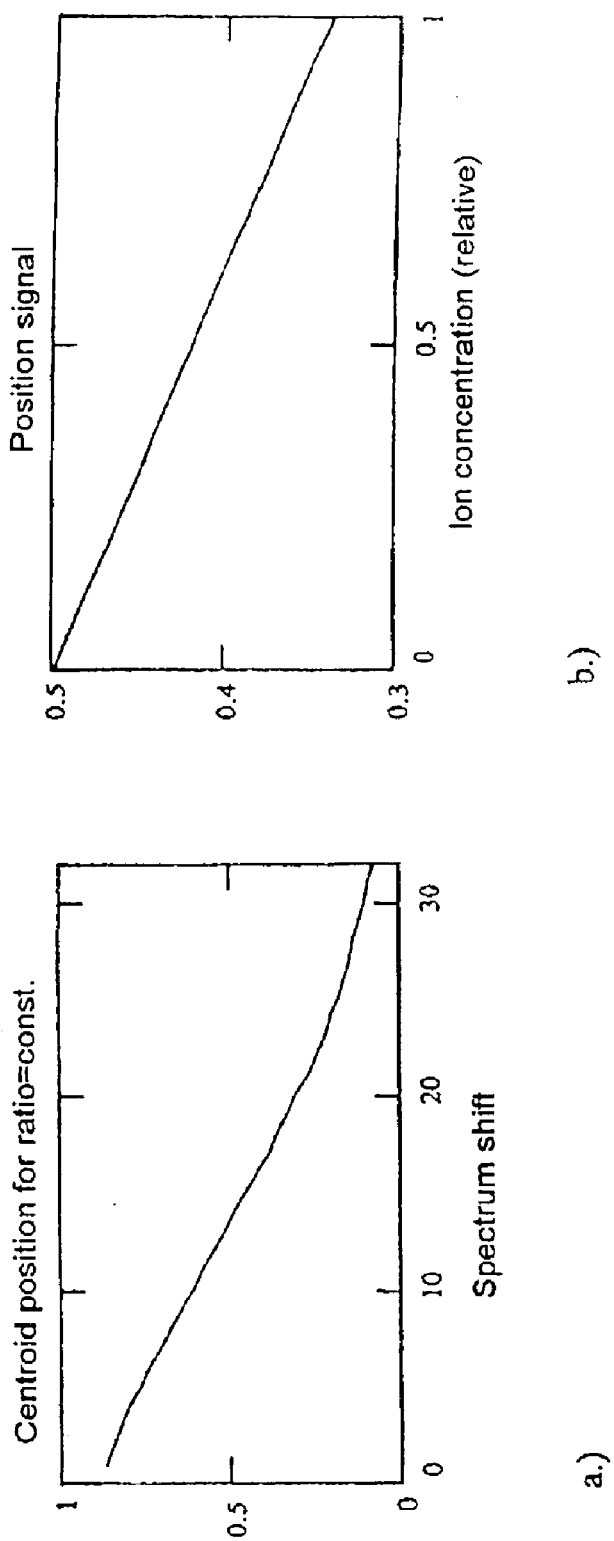
Figure: 8
Typical curve of position signal as a function of a) position of emission spectrum, b) of ion concentration

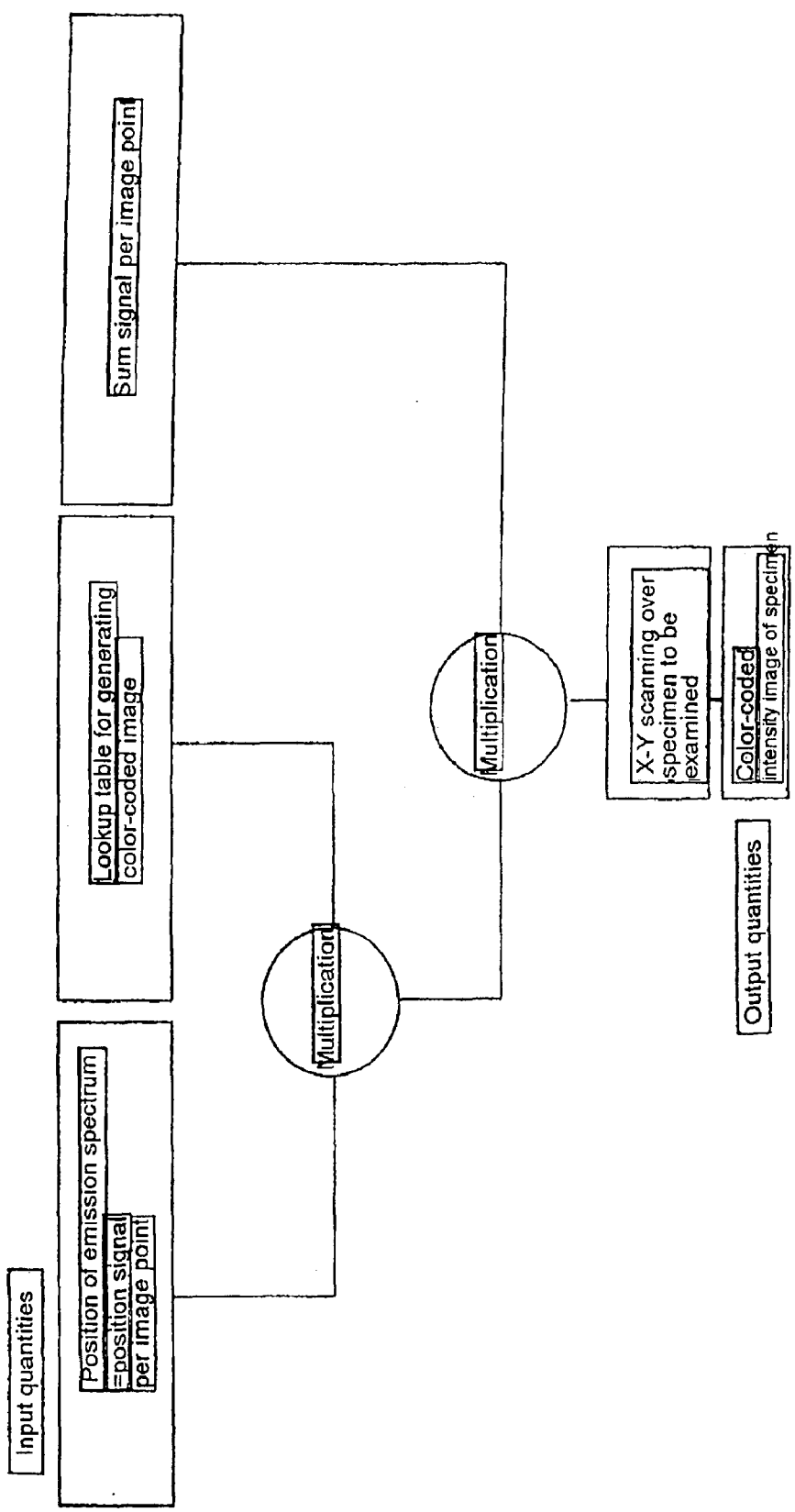
Figure: 9
Algorithm for generating color-coded intensity images using a plurality of dyes

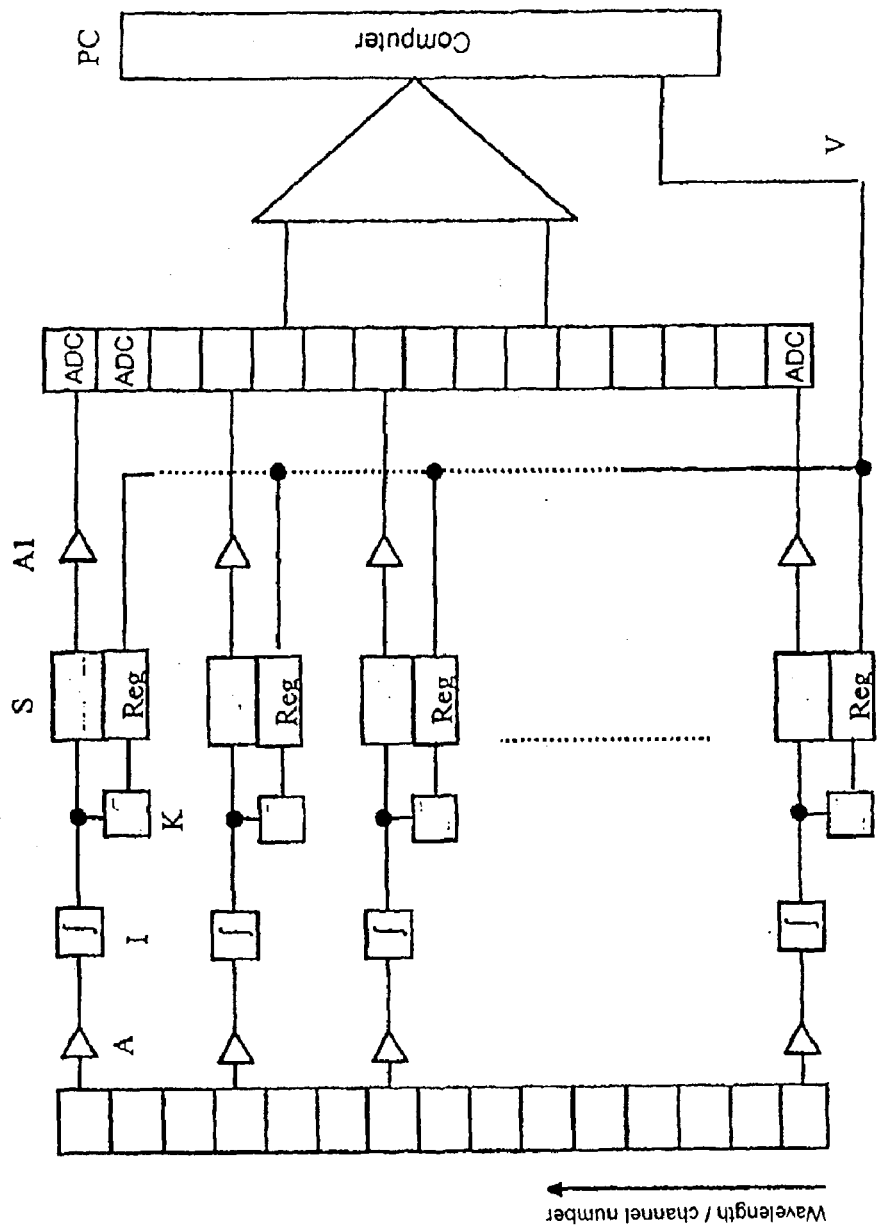
Figure: 10
Construction example of electronics for digital evaluation

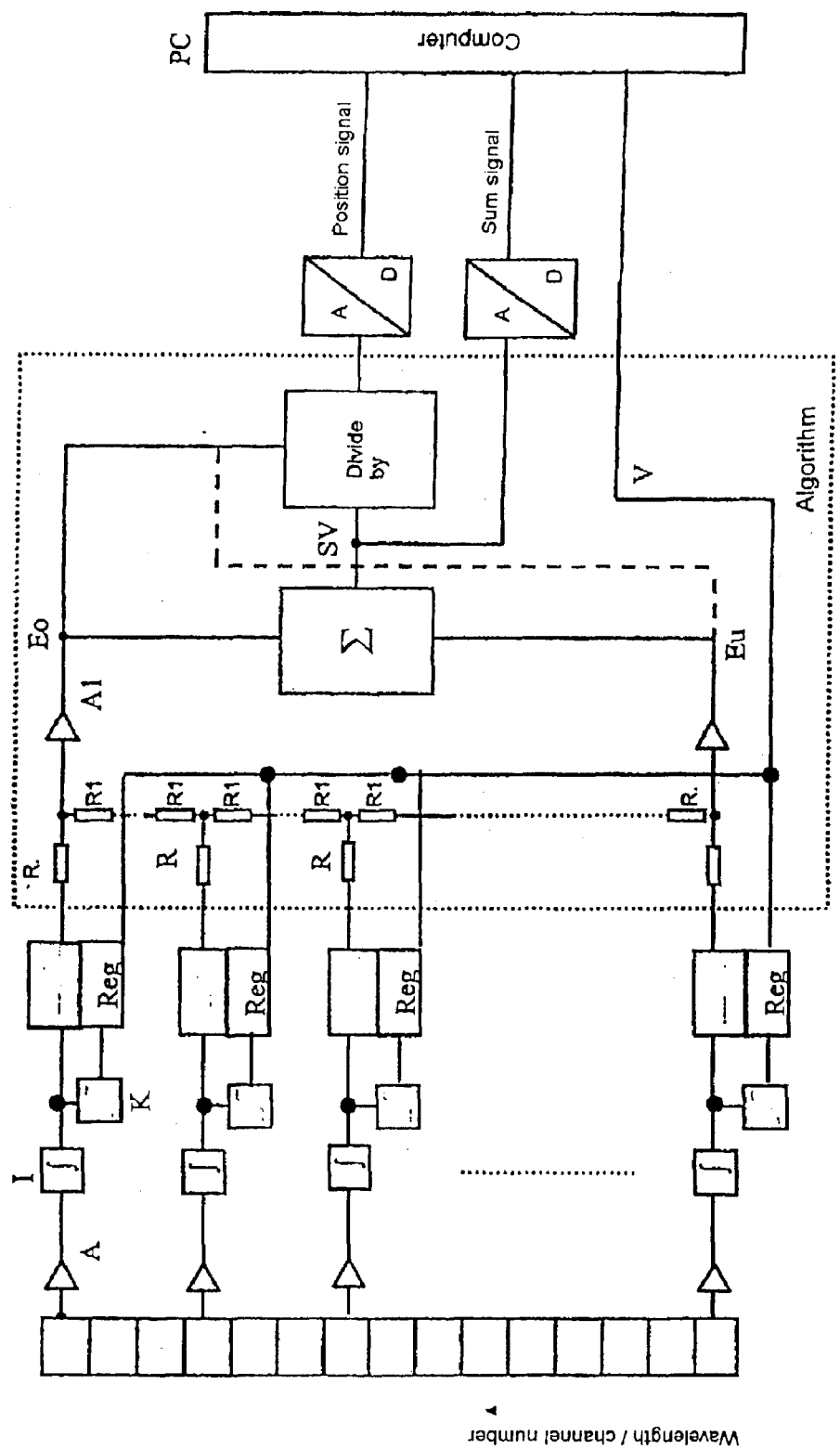
Figure: 11
Construction example of electronics for analog signal evaluation

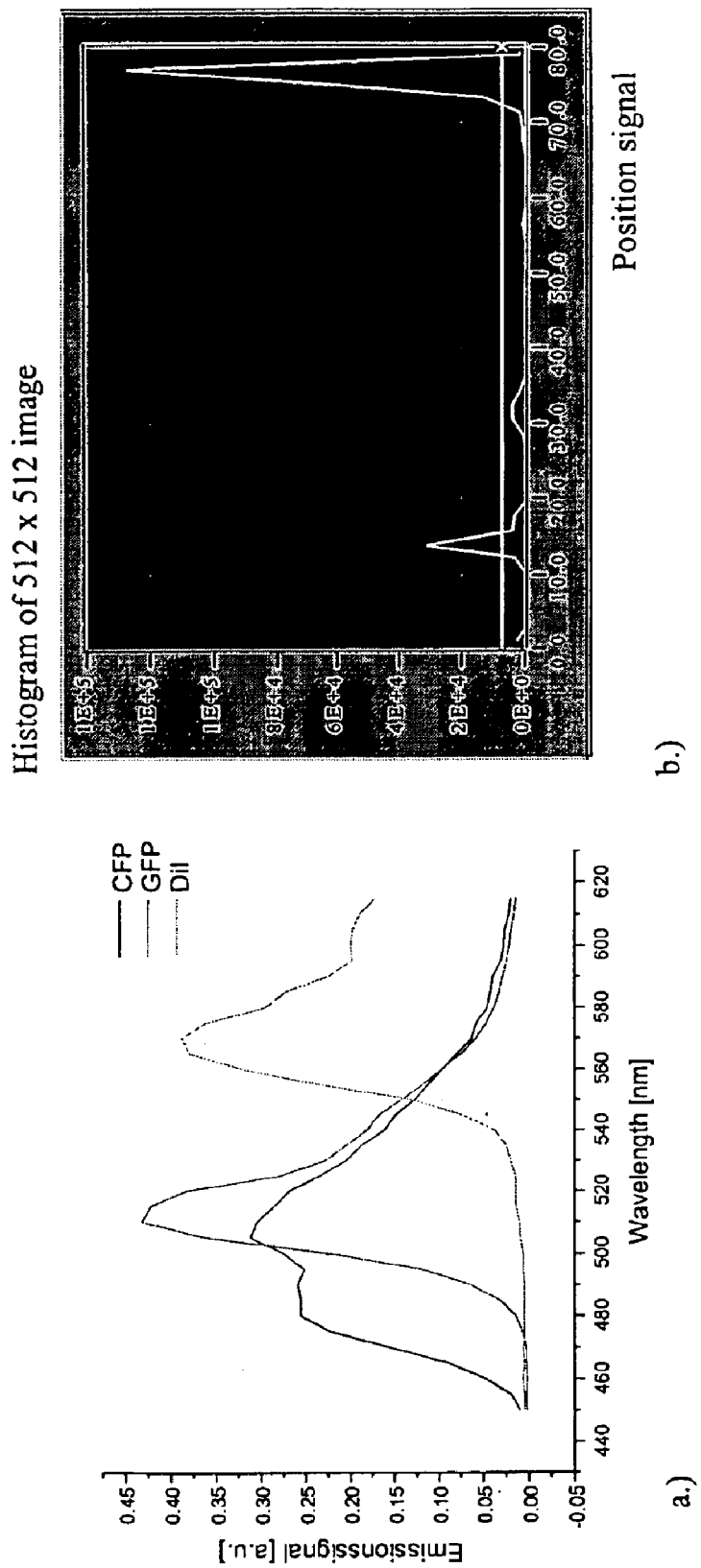
Figure: 12

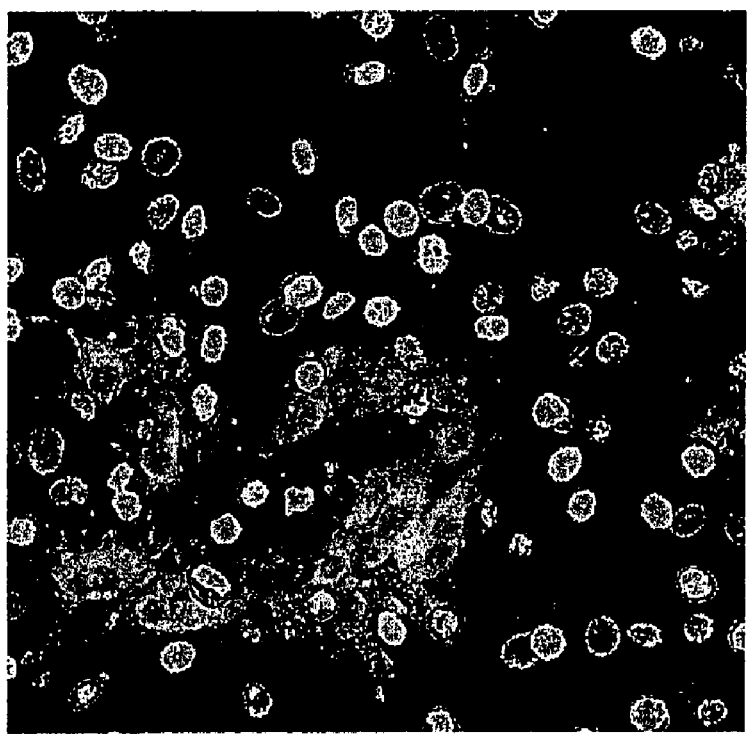
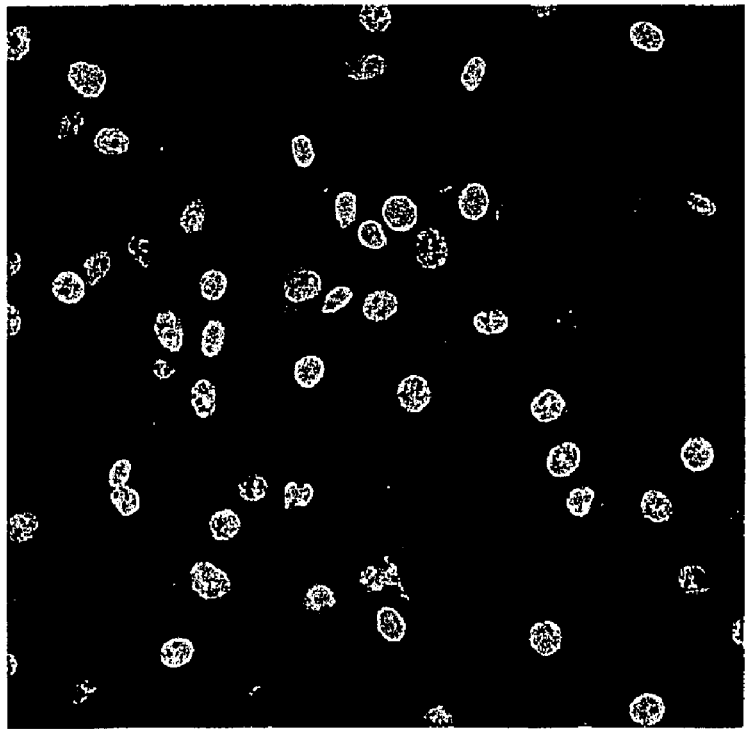
Figure: 13

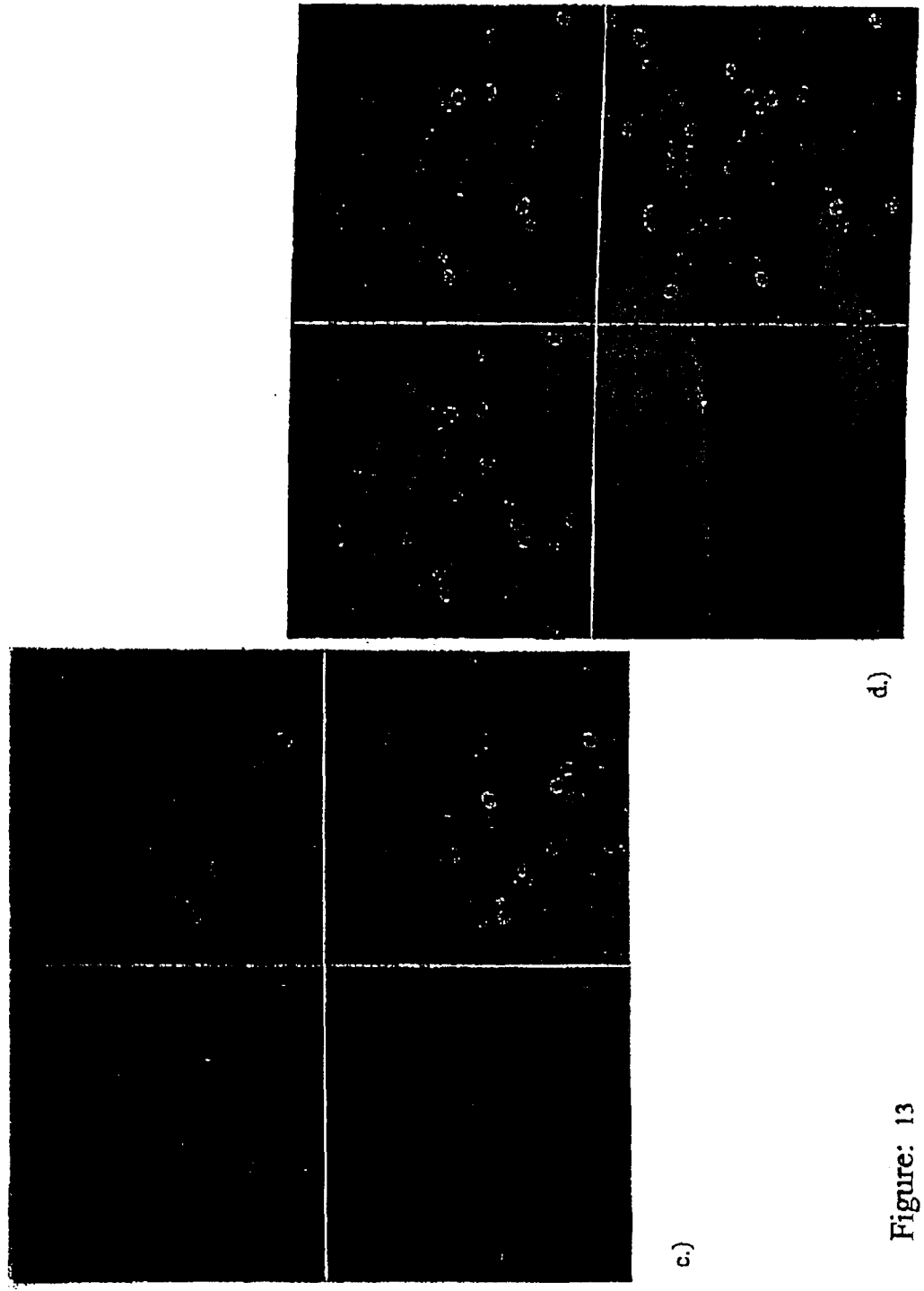
Figure: 13
c) Unfolded intensity image; d) intensity image with conventional detection according to prior art

METHOD FOR THE DETECTION OF DYES IN FLUORESCENCE MICROSCOPY

CROSS REFERENCE TO RELATED APPLICATION

This is a Continuation Application under 37 C.F.R. 1.53 (b). Priority is hereby claimed under 35 U.S.C. §120 to application Ser. No. 09/895,517 filed Jun. 28, 2001. The application filed herein also claims foreign priority under 35 U.S.C. §119 to DE 100 33 180.7 filed Jun. 29, 2000 priority to which was claimed in said parent application Ser. No. 09/895,517. Priority is also claimed under 35 U.S.C. §119(e) to U.S. Provisional application 60/230,345 filed Sep. 6, 2000.

BACKGROUND OF THE INVENTION a) Field of the Invention

The invention is directed to a method and an arrangement in fluorescence microscopy, particularly laser scanning microscopy, fluorescence correlation spectroscopy, and nearfield scanning microscopy, for examination of predominantly biological specimens, preparations and associated components. This includes methods for screening active ingredients based on fluorescence detection (high throughput screening). The transition from the detection of a few broad-spectrum dye bands to the simultaneous acquisition of whole spectra opens up new possibilities for the identification, separation and allocation of mostly analytic or functional specimen characteristics to spatial partial structures or dynamic processes. Therefore, simultaneous examination of specimens with multiple fluorophores with overlapping fluorescence spectra are even possible in spatial structures of thick specimens. In addition, it is possible to detect local spectral shifts of emission bands of the dyes and to allocate them to the spatial structures. The data acquisition rate is not reduced by the arrangement.

b) Description of the Related Art

A typical area of application of light microscopy for examining biological preparations is fluorescence microscopy (Pawley, "Handbook of Biological Confocal Microscopy"; Plenum Press 1995). In this case, determined dyes are used for specific marking of cell parts.

The irradiated photons having a determined energy excite the dye molecules, through the absorption of a photon, from the ground state to an excited state. This excitation is usually referred to as one-photon or single-photon absorption (FIG. 1a). The dye molecules excited in this way can return to the ground state in various ways. In fluorescence microscopy, the most important is the transition with emission of a fluorescence photon. Because of the Stokes shift, there is generally a red shift in the wavelength of the emitted photon in comparison to the excitation radiation; that is, it has a greater wavelength. Stokes shift makes it possible to separate the fluorescence radiation from the excitation radiation.

The fluorescent light is split off from the excitation radiation by suitable dichroic beam splitters in combination with blocking filters and is observed separately. This makes it possible to show individual cell parts that are dyed with different dyes. In principle, however, several parts of a preparation can also be dyed simultaneously with different dyes which bind in a specific manner (multiple fluorescence). Special dichroic beam splitters are used again to distinguish the fluorescence signals emitted by the individual dyes.

In addition to excitation of dye molecules with a high-energy photon (single-photon absorption), excitation with a plurality of low-energy photons is also possible (FIG. 1b). The sum of energies of the single photons corresponds approximately to a multiple of the high-energy photon. This type of excitation of dyes is known as multi-photon absorption (Corle, Kino, "Confocal Scanning, Optical Microscopy and Related Imaging Systems"; Academic Press 1996). However, the dye emission is not influenced by this type of excitation, i.e., the emission spectrum undergoes a negative Stokes shift in multi-photon absorption; that is, it has a smaller wavelength compared to the excitation radiation. The separation of the excitation radiation from the emission radiation is carried out in the same way as in single-photon excitation.

The prior art will be explained more fully in the following by way of example with reference to a confocal laser scanning microscope (LSM) (FIG. 2[L1].

An LSM is essentially composed of four modules: light source, scan module, detection unit and microscope. These modules are described more fully in the following. In addition, reference is had to DE19702753A1.

Lasers with different wavelengths are used in an LSM for specific excitation of different dyes in a preparation. The choice of excitation wavelengths is governed by the absorption characteristics of the dyes to be examined. The excitation radiation is generated in the light source module. Various lasers (argon, argon/krypton, Ti:Sa lasers) are used for this purpose. Further, the selection of wavelengths and the adjustment of the intensity of the required excitation wavelength is carried out in the light source module, e.g., using an acousto-optic crystal. The laser radiation subsequently reaches the scan module via a fiber or a suitable mirror arrangement.

The laser radiation generated in the light source is focussed in the preparation in a diffraction-limited manner by means of the objective (2) via the scanner, scanning optics and tube lens. The focus scans the specimen in a point raster in x-y direction. The pixel dwell times when scanning over the specimen are mostly in the range of less than one microsecond to several seconds.

In confocal detection (descanned detection) of fluorescent light, the light emitted from the focal plane (specimen) and from the planes located above and below the latter reaches a dichroic beam splitter (MDB) via the scanner. This dichroic beam splitter separates the fluorescent light from the excitation light. The fluorescent light is subsequently focused on a diaphragm (confocal diaphragm/pinhole) located precisely in a plane conjugate to the focal plane. In this way, fluorescent light components outside of the focus are suppressed. The optical resolution of the microscope can be adjusted by varying the size of the diaphragm. Another dichroic blocking filter (EF) which again suppresses the excitation radiation is located behind the diaphragm. After passing the blocking filter, the fluorescent light is measured by means of a point detector (PMT).

When using multi-photon absorption, the excitation of the dye fluorescence is carried out in a small volume at which the excitation intensity is particularly high. This area is only negligibly larger than the detected area when using a confocal arrangement. Accordingly, a confocal diaphragm can be dispensed with and detection can be carried out directly following the objective (non-descanned detection).

In another arrangement for detecting a dye fluorescence excited by multi-photon absorption, descanned detection is carried out again, but this time the pupil of the objective is imaged in the detection unit (nonconfocal descanned detection).

From a three-dimensionally illuminated image, only the plane (optical section or slice) located in the focal plane of the objective is reproduced by the two detection arrangements in connection with corresponding single-photon absorption or multi-photon absorption. By recording or plotting a plurality of optical slices in the x-y plane at different depths z of the specimen, a three-dimensional image of the specimen can be generated subsequently in computer-assisted manner.

Accordingly, the LSM is suitable for examination of thick preparations. The excitation wavelengths are determined by the utilized dye with its specific absorption characteristics. Dichroic filters adapted to the emission characteristics of the dye ensure that only the fluorescent light emitted by the respective dye will be measured by the point detector.

Currently, in biomedical applications, a number of different cell regions are labeled simultaneously by different dyes (multifluorescence). In the prior art, the individual dyes can be detected separately based on different absorption characteristics or emission characteristics (spectra). For this purpose, an additional splitting of the fluorescent light of a plurality of dyes is carried out with the secondary beam splitters (DBS) and a separate detection of the individual dye emissions is carried out in separate point detectors (PMT x). With the arrangement described above, it is impossible for the user to flexibly adapt detection and excitation to corresponding new dye characteristics. Instead, new dichroic beam splitters and blocking filters must be created for every (new) dye. In an arrangement according to DE . . . . , the fluorescent light is split spectrally by means of a prism. The method differs from the above-described arrangement with dichroic filters only in that the characteristic of the utilized filter is adjustable. However, it is still preferable to record the emission band of a dye by point detector.

The limits of the previous detection devices are reached when the emission spectra of two dyes overlap. In order to prevent crosstalk between two dyes, the spectral detection area must be limited. In this case, the area in which the two dyes overlap is simply cut out and not detected. This reduces the efficiency of the detection unit. The same signal-to-noise ratio can be achieved only by increasing the excitation output, which could lead to damage to the preparation. Therefore, at the present time, a maximum of six different dye probes are used simultaneously, since the dyes could not otherwise be separated because of the heavily overlapping emission bands.

Previously, dyes were modified in such a way that they differed from each other either with respect to their absorption characteristics or their emission characteristics. FIG. 3a shows the emission spectra of different typical dyes. The emission signal is plotted over wavelength. It will be noted that the dyes designated by 1 to 4 differ from one another in the position and shape of their emission spectra. In most cases, however, these dyes are toxic for in vivo preparations. Therefore, investigations of the evolution of cell bonds in living preparations are not possible.

Naturally occurring dyes, so-called fluorescent proteins (GFP, YFP, CFP, TOPAS, GFT, RFP), were discovered in the late 1990s (Clonetech, USA). These dyes are distinguished by their reduced influence on specimens. They are therefore particularly suitable for labeling cell regions in living preparations. However, it is disadvantageous that the dyes differ only slightly with respect to their emission characteristics. FIG. 3b shows the emission signals as a function of the wavelength for the dyes GFP, Topas, GFT and Cyan-FP.

With conventional methods, only CFP and RFP, due to their altered absorption characteristics, could be separated from the rest efficiently, i.e., in sequential image recording. It is not possible to separate the dyes GFP and GFT at all by conventional means.

In another method for determining the localization of two proteins, both proteins are labeled with different dyes, wherein the emission spectrum of the first dye overlaps with the absorption spectrum of the second dye. The first dye is subsequently excited to fluorescence with a suitable wavelength. When both molecules are located very close to one another (<10 nm), the emission radiation of the first dye can be absorbed by the second, so that the second dye and not the first dye subsequently emits. FIG. 3d shows the energy level diagram for this process which is known in the literature as Fluorescent Resonant Energy Transfer (FRET) (Fan, et al., Biophysical Journal, V 76, May 1999, P 2412–2420). When the emission radiation of the two dyes is detected with this method and the ratio of both detection signals is determined, the distance between the two molecules can be determined.

Further, it is known that the emission spectrum of a dye found in a biological preparation can differ from the emission spectrum measured in a dye cuvette. FIG. 3c shows the emission spectra of a dye as a function of the environment in which the dye is found. In the Figure, the emission signal is plotted over wavelength.

The wavelength shift can amount to several times 10 nm. More precise investigations of the dependency of this wavelength shift on the environment were not known previously, since an investigation of this kind was very difficult to carry out using the methods according to the prior art. While spectrometers are also currently used in combination with an LSM, a conventional, usually high-resolution spectrometer is used instead of a point detector (Patent: Dixon, et al. U.S. Pat. No. 5,192,980). However, these spectrometers can record an emission spectrum only point by point or as an average over a region. Thus, this is a type of spectroscopy. In another arrangement, the lifetime of the dye fluorescence is measured, so that the type of environment can be deduced. However, a long data acquisition time would be required for recording a complete image. Therefore, these methods can only be used conditionally for examining living preparations.

In another application of fluorescence microscopy, the ion concentration (e.g., $Ca^+$, $K^+$, $Mg^{2+}$, $ZN^+$, . . . ) is determined, particularly in biological preparations. Special dyes or dye combinations (e.g., Fura, Indo, Fluo; Molecular Probes, Inc.) having a spectral shift depending on the ion concentration are used for this purpose. FIG. 4a shows the emission spectra of Indo-1 in dependence on the concentration of calcium ions. FIG. 4b shows an example of the emission spectra depending on the calcium ion concentration using the combination of Fluo-3 and Fura Red dyes. These special dyes are known as emission ratio dyes. When the two fluorescence areas shown in FIG. 4a are detected again and the ratio of both intensities is taken, the corresponding ion concentration can be determined. In these measurements, the examination is usually directed to dynamic change in the ion concentration in living preparations requiring a time resolution of less than one millisecond.

OBJECT AND SUMMARY OF THE INVENTION

Therefore, the primary object of the invention is the provision of novel methods for flexible and freely programmable detection. These methods should be usable in image-generating and analytic microscopy systems. Therefore, the data acquisition rate may not be worsened when using these methods. The microscope systems are image-generating systems such as laser scanning microscopes for three-dimensional examination of biological preparations with an optical resolution of up to 200 nm, nearfield scanning microscopes for high-resolution examination of surfaces with a resolution of up to 10 nm, fluorescence correlation microscopes for quantitative determination of molecular concentrations and for measuring molecular diffusions. Also included are methods based on fluorescence detection for screening dyes.

In all of the systems mentioned above, fluorescence dyes are used for specific labeling of the preparation. These objectives are met by methods and arrangements according to the patent claims.

Dyes which overlap partially or even completely can still be separated by means of the invention and the above-mentioned disadvantages and limitations of formerly employed techniques can be circumvented or overcome. This enables multifluorescence recordings using naturally occurring fluorescent proteins. Further, this method makes it possible to determine in a particularly efficient manner wavelength shifts based on different environments in the preparations to be examined.

In accordance with the invention, a method for optical detection of characteristic quantities of the wavelength-dependent behavior of an illuminated specimen, such as the emission behavior and/or absorption behavior, preferably the fluorescence and/or enzyme fluorescence comprises determining at least one spectral centroid and/or a maximum of the emission radiation and/or of the absorbed radiation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 1a illustrates single photon absorption of a specimen;

FIG. 1b illustrates illumination of a specimen with a plurality of low-energy photons producing multiphoton absorption;

FIG. 2 illustrates a known construction in block diagram form of a confocal laser scanning microscope;

FIGS. 3a, 3b, 3c and 3d illustrate typical spectra shown in graphical form;

FIGS. 4a and 4b illustrate typical spectra with ratiometric measurements;

FIG. 5 is a block diagram showing the construction of detector unit-optics;

FIG. 6 is a schematic example for detector unit-optics construction;

FIG. 7 shows an algorithm for determining the position of the emission spectrum;

FIGS. 8a and 8b show the typical curve of position signal as a function of a) position of emission spectrum and b) of ion concentration;

FIG. 9 shows an algorithm for generating color-coded intensity images using a plurality of dyes;

FIG. 10 illustrates a schematic diagram of an example of electronics for digital evaluation;

FIG. 11 illustrates a schematic diagram of an example of electronics for analog evaluation;

FIGS. 12a and 12b graphically show dye spectra (a) and a histogram (b) of shift in emission spectra for the dyes shown in a);

FIGS. 13a and 13b are images of an experiment for separation of dyes showing a) sum intensity image and b) image of wavelength shift; and FIGS. 13c and 13d are images showing a) unfolded intensity image and an intensity image with conventional detection according to the prior art.

DESCRIPTION OF THE PREFERRED EMBODIMENTS

The method for flexible detection is based on a spectrally split detection of fluorescence. For this purpose, the emission light is split from the excitation light in the scan module or in the microscope (with multiphoton absorption) by means of the main color splitter (MDB). A block diagram of the detector unit to be described is shown in FIG. 5. With confocal detection, the light from the specimen is focused through a diaphragm (pinhole) PH by means of imaging optics PO, so that fluorescence occurring outside of the focus is suppressed. In non-descanned detection, the diaphragm is omitted. The light is now divided into its spectral components by means of an angle-dispersive element DI. The angle-dispersive elements can be prisms, gratings and acousto-optic elements. The light which is split into its spectral components by the dispersive element is subsequently imaged on a line detector DE. This line detector DE measures the emission signal depending on the wavelength and converts it into electrical signals S( ). In addition, a line filter for suppressing the excitation wavelengths can be arranged in front of the detection unit.

A possible embodiment form of the optical beam path of the detector unit shown in the block diagram in FIG. 5 is shown in FIG. 6. The construction is essentially a Czerny Turner construction. In confocal detection, the light L from the specimen is focused through the confocal diaphragm PH by the pinhole optics PO. In non-descanned detection in case of multiphoton absorption, this diaphragm can be omitted. The first imaging mirror S1 collimates the fluorescent light. Subsequently, the light strikes a line grating G, for example, a grating with a line number of 651 lines per mm. The grating bends the light in different directions corresponding to its wavelength. The second imaging mirror S2 focuses the individual spectrally split wavelength components on the corresponding channels of the line detector DE. The use of a secondary electron multiplier array by Hamamatsu H7260 is especially advantageous. The detector has 32 channels and high sensitivity. The free spectral region of the embodiment form described above is approximately 350 nm. In this arrangement, the free spectral region is uniformly distributed to the 32 channels of the line detector resulting in an optical resolution of approximately 10 nm. Therefore, this arrangement is suitable for spectroscopy only conditionally. However, its use in an image-generating system is advantageous because the signal per detection channel is still relatively large due to the relatively broad detected spectral band. A shift of the free spectral region can be carried out in addition by rotating the grating, for example.

Another possible embodiment form could consist in the use of a matrix detector (e.g., a CCD, . . . ). In this case, splitting into different wavelength components is carried out in a coordinate through the dispersive element. A complete line (or column) of the descanned image is formed in the other direction on the matrix detector. This embodiment form is particularly advantageous in the construction of a line scanner (Corle, Kino, "Confocal Scanning Optical Microscopy and Related Imaging Systems"; Academic Press 1996). The basic construction essentially corresponds to that of an LSM according to FIG. 2. However, instead of a point focus, a line is imaged in the focus and the specimen to be examined is scanned in only one direction. A slit diaphragm is used as confocal diaphragm instead of a pinhole diaphragm in a construction of this kind. Non-descanned detection can also be carried out with this arrangement using a multiphoton absorption. The confocal diaphragm can again be omitted in this case.

The evaluation algorithm for the arrangement shown in FIG. 6, that is, for a point scanner, is described in the following. However, the algorithm can be applied without restrictions to the arrangement for a line scanner.

As will be seen from FIGS. 3 and 4, the individual dyes differ with respect to the position and shape of the emission spectra. The algorithm (FIG. 7) determines, per image point, the position of the centroid and maxima of the emission signal detected in the image point. One advantageous possible way of determining the centroid will be described in more detail in the following. Other ways of determining the centroid or maxima, such as interpolation fits, etc., are a part of the invention without restriction. The signals detected by the line detector per channel (graph at left) are multiplied by a calibrating function (graph at right), i.e., every channel is given a determined weighting. The graph at left in FIG. 7 represents, by way of example, a measured emission signal depending on the channel number in which the signal was detected. The graph at right shows an example of a weighting function for the corresponding individual channels depending on the channel number.

The weighted individual signals per channel are now summed and divided by the sum of the unweighted individual signals per channel (sum signal). This results in a signal that is a characteristic measurement for the position of the centroid of the emission spectrum and, therefore, of an excited dye (FIG. 8a). This signal is referred to hereinafter as a position signal. FIG. 8a shows the position signal depending on the position of the centroid or maximum of the detected emission spectrum.

Different dyes can be distinguished based on their position and type of emission spectra by measuring the position signal. Further, when using a dye, for instance, the wavelength shift of the emission spectrum depending on environment can be measured.

When a plurality of dyes are found in the image point simultaneously, a linear combination of the position of the centroid is given depending on concentration of one dye in comparison to the other dye according to the following $$\text{Position} = \sum_{k}^{n} Pos_{S_k} \cdot C_k,$$

equation:
where $Pos_k$ is the characteristic position of the centroid of a dye, $C_k$ is the concentration of a dye, and n is the quantity of dyes excited simultaneously in the image point. The algorithm can accordingly also determine ion concentrations and can be used for detecting a FRET signal. In addition, an analysis of the local overlapping of two or more dyes is possible (co-localization measurement).

The signal depending on ion concentration using two dyes (e.g., Fluo-3 and Fura Red, Molecular Probes, Inc.) or one dye with two characteristic emission bands (e.g., Indo, Molecular Probes, Inc.) is shown in FIG. 8b. The position signal is plotted as a function of ion concentration.

As was already mentioned, the position signal is a measure of the position of the centroid of the emission spectrum. Accordingly, it can be used as a mask for calculating a color-coded intensity image. The algorithm is shown schematically in FIG. 9. For this purpose, the mask (that is, the position signal) is multiplied by a corresponding lookup table in the first step. The lookup table contains the corresponding color correlation depending on the position of the centroid of the emission spectrum. Subsequently, the product of this multiplication is multiplied by the intensity value (the sum signal), that is, the brightness of the color is matched with the actual fluorescence intensity. Depending on the choice of lookup table, color-masked intensity images (discrete color distribution), i.e., only one dye stands out per pixel, or intensity images with mixed colors can be generated by a compilation of individual image points to form an image.

The decisive advantage of the method consists in that the fluorescence of each dye in its entirety (sum signal) can be detected independent from the degree of overlap of the emission spectra and, nevertheless, the dyes can be shown separately (by the position signal). Heavily overlapping dyes (FIG. 3c) can therefore be detected particularly efficiently.

Digital or analog implementation of the algorithm can be carried out in the construction according to FIG. 6. Both arrangements are described more fully in the following. An arrangement for digital calculation of the sum signal and position signal is shown schematically in FIG. 10. In this case, the current at the anode of a multichannel PMT is converted to voltage and amplified through the first amplifier A (connected as current-voltage converter). The voltage is fed to an integrator I which integrates the signal over a corresponding time (e.g., pixel dwell time).

For faster evaluation, the integrator I can be followed by a comparator K which, as a simple comparator, has a switching threshold such that a digital output signal is generated when this threshold is exceeded or which is constructed as a window comparator and then forms a digital output signal when the input signal lies between the upper and lower switching threshold or when the input signal lies outside (below or above) the switching threshold. The comparator or window comparator can be arranged before as well as after the integrator. Circuit arrangements without an integrator (so-called amplifier mode) are also possible. With the amplifier mode arrangement, the comparator K is also arranged after corresponding level matching. The output of the comparator K serves as a control signal for a switch register Reg which directly switches the active channels (online), or the state is conveyed to the computer via an additional connection V in order to make an individual selection of active channels (offline). The output signal of the integrator I is fed directly to another amplifier A1 for level matching for the subsequent analog-to-digital conversion AD. The A/D-converted values are transferred via suitable data transfer to a computer (PC or digital signal processor DSP) which carries out the calculation of the position signal and sum signal according to FIGS. 7 and 9.

An equivalent of the arrangement in FIG. 10 based on analog data processing is shown in FIG. 11 The signals of the individual channels are again transformed into voltage signals by an amplifier. Subsequently, the individual voltage signals are integrated in an integrator I during the pixel dwell time.

The integrator is followed by a comparator K which compares the integrated signal with a reference signal. If the integrated signal is smaller than the comparator threshold, then no fluorescence signal or a fluorescence signal which is too small would be measured in the corresponding individual channel. In this case, the signal of the individual channel should not be further processed because this channel only contributes a noise component to the total signal. In this case, the comparator actuates a switch S via Reg and the individual channel is switched off for the pixel that has just been measured. Accordingly, by means of the comparators in combination with the switches, the relevant spectral region for the image point just measured is selected automatically.

Subsequently, the integrated voltage signal is again converted to current by means of a resistance R. Accordingly, every individual channel generates a current dependent on the fluorescent intensity impinging on the individual channel. All adjacent individual channels are subsequently connected with another resistance R1 located between them. The occurring total current at the upper and lower end of the detector line is again converted into voltage by a current-voltage converter A1. The voltage at the upper and lower ends Eo and Eu corresponds to the sum of the signals of the individual channels weighted by opposing straight lines. The two signals at the upper and lower end are subsequently summed by a summing amplifier SV. The resulting signal corresponds to the sum signal of the total measured fluorescence. This sum signal and the signal of the upper end or the signal of the lower end (shown in dashes) are supplied to an analog divider which forms the position signal at the output.

The sum signal and position signal are then converted to digital signals by an analog-to-digital converter and further processed by the computer or DSP. However, the upper and lower signal can also be converted without restriction and processed by the computer. In this case, the computer would determine the sum signal and the position signal. In both cases, the algorithm according to FIG. 9 is carried out in the computer.

However, an implementation of the algorithm according to FIG. 9 can also be carried out in the circuit according to FIG. 11. For this purpose, three possibilities are described in detail in the following. In a first arrangement, the multiplication with the lookup table is carried out by a change of resistances (R1) located between the adjacent individual detection channels. The rest of the circuit is unchanged from that described in the beginning. In the second arrangement, the multiplication with the lookup table is carried out in the amplifier (A1). For this purpose, the amplifier A1 is operated with a variable nonlinear characteristic. In a third arrangement (digital (FIG. 10) and analog detection (FIG. 11)), a manipulation or distortion of the input signals of the individual detection channels is carried out: a change in the amplification of (A), a change in the integration times of (I), by inputting an additional offset before the integrator and/or by digital influence on the counted photons in a photon counting arrangement. All three methods can also be combined in any manner.

In order to prevent artifacts, it is necessary in case of fluorescence measurement to suppress the excitation light which is backscattered from the specimen or at least to attenuate it to the extent that it is less than or on the same order of magnitude as the emission maximum. To this end, the additional line filter described above or a correspondingly optimized main color splitter (MDB) can be used for optical attenuation. Since the spectral width of the exciting laser beam is very much smaller than the band width detected by the individual channel, the backscattered and reflected excitation radiation can also be carried out by deliberately switching off the corresponding individual channel with the switch shown in FIG. 11.

The arrangement according to FIG. 11 has several advantages over the arrangement according to FIG. 10. The most obvious advantage is that only two channels need to be converted to digital data and sent to the computer. This minimizes the data rates to be processed by the computer. This is particularly important when the method is applied in real-time microscopy in which, for example, more than 50 images with 512 512 pixels and a 12-bit pixel depth must be detected in order to be able to register the extremely fast-running dynamic processes. Further, when this method is used, no limits are imposed on the quantity of individual channels of the utilized line detector (matrix detector) and, accordingly, on the size of the detectable spectral range and/or the spectral resolution of the spectral sensor.

Further, in the device shown in FIG. 10, the signal level to be converted is substantially smaller. The expected signal-to-noise ratio is therefore lower.

With the two above-described arrangements for converting the evaluation algorithm, an integrator circuit was used to detect the individual channel signals. However, photon counting can also be carried out in the individual channels without restrictions. But the arrangement shown in FIG. 10 has the advantage that it also provides complete spectral information for subsequent image processing, in addition to the position signal. Therefore, the invention also includes a combination of the two arrangements.

FIG. 12 shows measurements which have been carried out with the arrangements shown in FIGS. 10 and 11. The emission spectra of the utilized dyes GFP, CFP and DI measured by a spectrometer are listed in FIG. 12a. The excitation of the dyes is carried out with an argon laser with a wavelength of 488 nm. These dyes were subsequently applied specifically to determined regions in a biological preparation. FIG. 12b shows a histogram of the position signal when scanning a specimen slice on which all three dyes are located. The three maxima are clearly recognizable in the histogram on which the three dyes have their characteristic position signal. The positions for the three dyes are listed in the following table:

| Dye | CFP | GFP | DI |
|---|---|---|---|
| Position signal (relative wavelength shift) | 14 | 30 | 80 |

Accordingly, the dyes should be easily separable with the arrangements according to the invention. In addition, local wavelength shifts due to the different local surroundings within a dye can be seen. This is shown in the width of the maxima for the individual dyes in the histogram.

FIG. 13a shows the intensity image formed from the sum signals. FIG. 13b shows the corresponding image formed from the position signals. This image incorporates the corresponding centroids of the emission spectra. The differently stained (partly with GFP, partly with CFP) cell nuclei are clearly distinguishable from the cell skeletons stained with DI.

FIG. 13c shows the color-coded intensity image calculated in accordance with the algorithm in FIG. 9. The individual regions to which different dyes have attached themselves are now separated by the color coding. The separation is illustrated by the depiction of an image in its three RGB channels. An image measured by detection according to the prior art is also shown in FIG. 13d for purposes of comparison. In this case, the detection is carried out only in extremely narrow spectral bands in order to prevent crosstalk between the fluorescence signals of different dyes. It was only possible to measure a fraction of the fluorescence signal emitted by the specimen due to the sharp constriction of the detection bands. The excitation output would have to be increased multiple times in order to obtain an image with the closest possible signal-to-noise ratio. This demonstrates the high efficiency of the arrangements according to the invention compared to arrangements according to the prior art. Further, regions in which the CFP or GFP accumulates cannot be separated because of the overlapping emission spectra of the two dyes. This is illustrated by the yellow stain in these cell regions and in the doubled appearance of regions in the two image channels (R and G).

While the foregoing description and drawings represent the present invention, it will be obvious to those skilled in the art that various changes may be made therein without departing from the true spirit and scope of the present invention.

What is claimed is:

1. A flexible and freely programmable laser scanning microscope method for optical detection of quantities of different dyes in a specimen by detecting the wavelength-dependent behavior of an illuminated specimen in an laser scanning microscope using spectra which may contain heavily overlapping dye spectra from different dyes which are simultaneously examined, such as the emission behavior, absorption behavior, fluorescence, luminescence, phosphorescence, enzyme-active light emission, naturally occurring dye fluorescence from fluorescent proteins or enzyme-active fluorescence of the illuminated specimen, comprising:

determining at least one spectral centroid position for different dye spectra detected by a spectral detector wherein a characteristic dye spectra is detected for at least one image point of the sample during a laser scan of the sample; and applying a characteristic spectral weighting function to the characteristic dye spectra that is detected to separate overlapping dye components and to calculate the intensity of each dye component per desired image point.

2. The method according to claim 1, wherein the determination of the centroid and of a maximum of the emission radiation of fluorochromes is carried out for distinguishing different dyes or for determining the local dye composition of an image point when a plurality of dyes are used simultaneously or for determining the local shift of the emission spectrum depending on the local environment to which the dye or dyes is or are attached or for measuring emission ratio dyes for determining ion concentrations.

3. The method according to claim 1, wherein the determination of the centroid and of a maximum of the reflected or transmitted excitation radiation of fluorochromes is carried out for distinguishing different dyes or for determining the local dye composition of an image point when a plurality of dyes are used simultaneously or for determining the local shift in the absorption spectrum depending on the local environment to which the dye or dyes is or are attached or for measuring the absorption ratio for determining ion concentrations.

4. The method according to claim 1, further comprising splitting the fluorescent radiation.

5. The method according to claim 1, further comprising splitting the radiation reflected or transmitted by the specimen by a dispersive element for absorption measurement and detecting the split radiation in a spatially resolved manner in at least one direction.

6. The method according to claim 1, further comprising carrying out a spectral weighting between a plurality of detection channels, summing of weighted channels of signals of the detection channels; and summing of the detection channels.

7. The method according to claim 6, wherein an upper and a lower signal corresponding to the sum of the signals of individual channels which are weighted by opposing weighting curves are read out, digitally converted and fed to the computer.

8. The method according to claim 1, further comprising weighting the signals of detection channels in that they are multiplied by a weighting curve, generating a sum signal in that the sum of the channels taken into account is determined, and generating a position signal is generated in that the sum of weighted signals is divided by the sum signal.

9. The method according to claim 8, wherein the weighting curve is a straight line.

10. The method according to claim 8, further comprising adjusting the weighting curve.

11. The method according to claim 8, further comprising determining in analog a position signal; and determining in analog the sum signal, converting the position signal and the sum signal; and reading out digitally the position signal and the sum signal.

12. The method according to claim 8, wherein a position signal and the sum signal are used to generate an image.

13. The method according to claim 8, wherein a position signal and the sum signal are combined with a lookup table.

14. The method according to claim 13, wherein representation of different dyes and/or the spread of the generated image is carried out by means of the lookup table.

15. The method according to claim 1, further comprising:

converting signals of detection channels digitally;

reading out the signals of the detection channels; and weighting and summing the signals of the detection channels digitally in a computer.

16. The method according to claim 15, wherein the weighting and summing of the signals of the detection channels are carried out with analog data processing by means of a resistance cascade.

17. The method according to claim 16, further comprising adjusting resistances.

18. The method according to claim 1, further comprising influencing signals of detector channels by a nonlinear distortion of the input signals.

19. The method according to claim 1, further comprising adjusting the integration parameters.

20. The method according to claim 1, further comprising adjusting a characteristic or response curve of an amplifier.

21. The method according to claim 1, wherein a color-coded fluorescence image is generated.

22. The method according to claim 1, wherein a superposition is carried out with additional images.

23. The method according to claim 1, wherein a comparison of a measured signal with a reference signal is carried out via comparators in detection channels and in case the reference signal is not reached or is exceeded a change in an operating mode of a detection channel is carried out.

24. The method according to claim 23, wherein a respective detection channel is switched off or not taken into account.

25. The method according to claim 1, wherein a relevant spectral region is narrowed in this way.

26. The method according to claim 1, wherein signals of detection channels are generated by at least one integrator circuit.

27. The method according to claim 1, wherein signals of detection channels are generated by photon counting and subsequent digital-to-analog conversion.

28. The method according to claim 1, wherein a photon counting is carried out in time correlation.

29. The method according to claim 1, for detection of single-photon or multiphoton fluorescence or fluorescence excited by entangled photons.

30. The method according to claim 1, with parallel illumination and detection, in ingredient screening, wherein the specimen is a microtiter plate.

31. The method according to claim 1, in a microscope.

32. The method according to claim 1, for detection in a nearfield scanning microscope.

33. The method according to claim 1, for detection of a single-photon or multiphoton dye fluorescence in a fluorescence-correlated spectroscope.

34. The method according to claim 1, using confocal detection.

35. The method according to claim 1, using a scanning arrangement.

36. The method according to claim 1, using an X-Y scanner in illumination means.

37. The method according to claim 1, using an X-Y scan table.

38. The method according to claim 1, using nonconfocal detection.

39. The method according to claim 1, using a scanning arrangement.

40. The method according to claim 1, using descanned detection.

41. The method according to claim 1, using brightfield imaging.

42. The method according to claim 1, using point imaging.

43. The method according to claim 1, using non-descanned detection.

44. The method according to claim 1, using brightfield imaging.

45. The method according to claim 1, using non-scanning, confocal or nonconfocal detection and point imaging or brightfield imaging.

46. The method according to claim 1, using an X-Y scan table.

47. The method according to claim 1 further comprising:
selecting a display color from a look-up table to indicate the type of dye present in the sample by selecting the determined spectral centroid position as the criteria to select display colors from the look-up table of dyes.

48. The method according to claim 1 further comprising:
displaying different dyes present in the sample based on the spectral centroid position without having the displayed colors overlap and without forming a discolored mix of colors.

49. The method of claim 1 wherein the image point is a pixel, and a characteristic spectra for each pixel of the sample is detected.

50. A flexible and freely programmable laser scanning microscope arrangement for optical detection of characteristic quantities of the wavelength-dependent behavior of an illuminated specimen with spectra which may contain heavily overlapping dye spectra from different dyes which are simultaneously examined, particularly the emission behavior, absorption behavior, fluorescence, luminescence, phosphorescence, enzyme-active light emission, naturally occurring dye fluorescence from fluorescent proteins, or enzyme-active fluorescence of an illuminated specimen, comprising:
a microscope,
a laser light source,
a laser scanning module,
a spectral detector,
a computer for determining at least one spectral centroid position for different dye spectra detected by the spectral detector wherein a characteristic dye spectra is detected for at least one image point of the sample during a laser scan of the sample and the computer applies a characteristic spectral weighting function to the characteristic dye spectra that is detected to separate overlapping dye components and to calculate the intensity of each dye component per desired image point.

51. The arrangement according to claim 50, wherein a splitting of the fluorescent radiation is carried out.

52. The arrangement according to claim 50, wherein the radiation reflected or transmitted by the specimen is split by a dispersive element for absorption measurement and is detected in a spatially resolved manner in at least one direction.

53. The arrangement according to claim 50, wherein a spectral weighting is carried out between a plurality of detection channels, a summing of weighted channels of the signals of the detection channels is carried out and summing of detection channels is carried out.

54. The arrangement according to claim 53, wherein the signals of detection channels are weighted in that they are multiplied by a weighting curve, a sum signal is generated in that the sum of the channels taken into account is determined, and a position signal is generated in that the sum of weighted signals is divided by the sum signal.

55. The arrangement according to claim 54, wherein the weighting curve is a straight line.

56. The arrangement according to claim 53, wherein signals of detection channels are converted and digitally read out and weighting and summing are carried out digitally in the computer.

57. The arrangement according to claim 54, wherein a position signal and the sum signal are determined in analog, converted, and read out digitally.

58. The arrangement according to claim 54, wherein a position signal and the sum signal are used to generate an image.

59. The arrangement according to claim 54, wherein a position signal and the sum signal are combined with a lookup table.

60. The arrangement according to claim 59, wherein representation of different dyes and/or the spread of the generated image is carried out by the lookup table.

61. The arrangement according to claim 53, wherein the weighting and summing are carried out with analog data processing by means of a resistance cascade.

62. The arrangement according to claim 61, wherein resistances are adjustable.

63. The arrangement according to claim 61, wherein the weighting curve is adjustable.

64. The arrangement according to claim 53, wherein an upper and a lower signal corresponding to the sum of the signals of individual channels which are weighted by opposing weighting curves are read out, digitally converted and fed to the computer.

65. The arrangement according to claim 50, wherein a color-coded fluorescence image is generated.

66. The arrangement according to claim 50, wherein a superposition is carried out with additional images.

67. The arrangement according to claim 50, wherein a comparison of a measured signal with a reference signal is carried out via comparators in detection channels and in case the reference signal is not reached or is exceeded a change in an operating mode of a detection channel is carried out.

68. The arrangement according to claim 50, wherein a respective detection channel is switched off and/or not taken into account.

69. The arrangement according to claim 50, wherein a relevant spectral region is narrowed in this way.

70. The arrangement according to claim 50, wherein signals of detection channels are generated by at least one integrator circuit.

71. The arrangement according to claim 50, wherein signals of detection channels are generated by photon counting and subsequent digital-to-analog conversion.

72. The arrangement according to claim 71, wherein a photon counting is carried out in time correlation.

73. The arrangement according to claim 50, for detection of single-photon and/or multiphoton fluorescence and/or fluorescence excited by entangled photons.

74. The arrangement according to claim 50, with parallel illumination and detection, in ingredient screening, wherein the specimen is a microtiter plate.

75. The arrangement according to claim 50, incorporated in a microscope.

76. The arrangement according to claim 75, for detection in a nearfield scanning microscope.

77. The arrangement according to claim 50, for detection of a single-photon and/or multiphoton dye fluorescence in a fluorescence-correlated spectroscope.

78. The arrangement according to claim 50, incorporating confocal detection.

79. The arrangement according to claim 50, including a scanning arrangement.

80. The arrangement according to claim 50, including an X-Y scanner in illumination source.

81. The arrangement according to claim 50, including an X-Y scan table.

82. The arrangement according to claim 50, incorporating nonconfocal detection.

83. The arrangement according to claim 50, with descanned detection.

84. The arrangement according to claim 50, with brightfield imaging.

85. The arrangement according to claim 50, with point imaging.

86. The arrangement according to claim 50, with non-descanned detection.

87. The arrangement according to claim 50, with non-scanning, confocal or nonconfocal detection and point imaging or brightfield imaging.

* * * * *